United States Patent
Torrant et al.

(10) Patent No.: US 9,542,336 B2
(45) Date of Patent: Jan. 10, 2017

(54) ISOCHRONOUS AGENT DATA PINNING IN A MULTI-LEVEL MEMORY SYSTEM

(71) Applicant: INTEL CORPORATION, Santa Clara, CA (US)

(72) Inventors: Marc Torrant, Sacramento, CA (US); David Puffer, Tempe, AZ (US); Blaise Fanning, Folsom, CA (US); Bryan White, Chandler, AZ (US); Joydeep Ray, Folsom, CA (US); Neil Schaper, Folsom, CA (US); Todd Witter, Orangevale, CA (US); Altug Koker, El Dorado Hills, CA (US); Aditya Sreenivas, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 162 days.

(21) Appl. No.: 14/133,097

(22) Filed: Dec. 18, 2013

(65) Prior Publication Data

US 2015/0169439 A1 Jun. 18, 2015

(51) Int. Cl.
G06F 12/02 (2006.01)
G06F 12/08 (2016.01)
G06F 12/10 (2016.01)
G06F 12/12 (2016.01)

(52) U.S. Cl.
CPC ......... G06F 12/126 (2013.01); *G06F 2212/69* (2013.01)

(58) Field of Classification Search
None
See application file for complete search history.

(56) References Cited

U.S. PATENT DOCUMENTS

| 6,662,289 | B1* | 12/2003 | Ang | 711/202 |
| 2014/0047175 | A1* | 2/2014 | Abali et al. | 711/105 |
| 2014/0304475 | A1* | 10/2014 | Ramanujan et al. | 711/128 |

* cited by examiner

Primary Examiner — Reginald Bragdon
Assistant Examiner — Edward Wang
(74) Attorney, Agent, or Firm — Lowenstein Sandler LLP

(57) ABSTRACT

A processing device comprises an instruction execution unit, a memory agent and pinning logic to pin memory pages in a multi-level memory system upon request by the memory agent. The pinning logic includes an agent interface module to receive, from the memory agent, a pin request indicating a first memory page in the multi-level memory system, the multi-level memory system comprising a near memory and a far memory. The pinning logic further includes a memory interface module to retrieve the first memory page from the far memory and write the first memory page to the near memory. In addition, the pinning logic also includes a descriptor table management module to mark the first memory page as pinned in the near memory, wherein marking the first memory page as pinned comprises setting a pinning bit corresponding to the first memory page in a cache descriptor table and to prevent the first memory page from being evicted from the near memory when the first memory page is marked as pinned.

20 Claims, 12 Drawing Sheets

ISOCHRONOUS AGENT DATA PINNING IN A MULTI-LEVEL MEMORY SYSTEM

TECHNICAL FIELD

This disclosure relates to the field of processing devices and, in particular, to isochronous agent data pinning in a multi-level memory system.

BACKGROUND

In a processing system, certain devices have expected performance standards. These performance standards are satisfied by the retrieval of requested data from memory in a sufficient amount of time so as not to interrupt the operation of the requesting devices. Retrieval of data within the prescribed time can be accomplished by maintaining all of the data that the requesting devices may need to access in high performance, high speed memory with low latency for data accesses. This, however, can significantly increase the cost of the processing system because potentially a large amount of expensive high-speed memory would be needed.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Described herein is a method and system for isochronous agent data pinning in a multi-level memory system. In a multi-level memory system, which includes a much slower far memory, such as a non-volatile memory (e.g., non-volatile random access memory (NVRAM)), there is a possibility that an isochronous device, such as graphics, display or imaging engine, will not be able to be supplied with enough bandwidth if a request ends up being serviced by that far memory, as opposed to a quicker near memory (e.g., dynamic random access memory (DRAM). Additionally, conventional system may have a limited amount of near memory, so not all data requests can be serviced from that near memory.

In one embodiment, memory control unit in a processing device includes pinning logic to pin memory pages in the near memory upon request by a memory agent. The pinning logic includes an agent interface module to receive, from the memory agent, a pin request indicating a first memory page in the multi-level memory system. The pinning logic further includes a memory interface module to retrieve the first memory page from the far memory and write the first memory page to the near memory. In addition, the pinning logic also includes a descriptor table management module to mark the first memory page as pinned in the near memory, for example by setting a pinning bit corresponding to the first memory page in a cache descriptor table, and to prevent the first memory page from being evicted from the near memory when the first memory page is marked as pinned. This allows certain memory ranges (either contiguous ranges or single memory pages) to be guaranteed to be available in near memory for use by the memory agents. This will reduce or eliminate the latency that may normally be attributed to retrieving the memory pages from the far memory.

Figure 1:
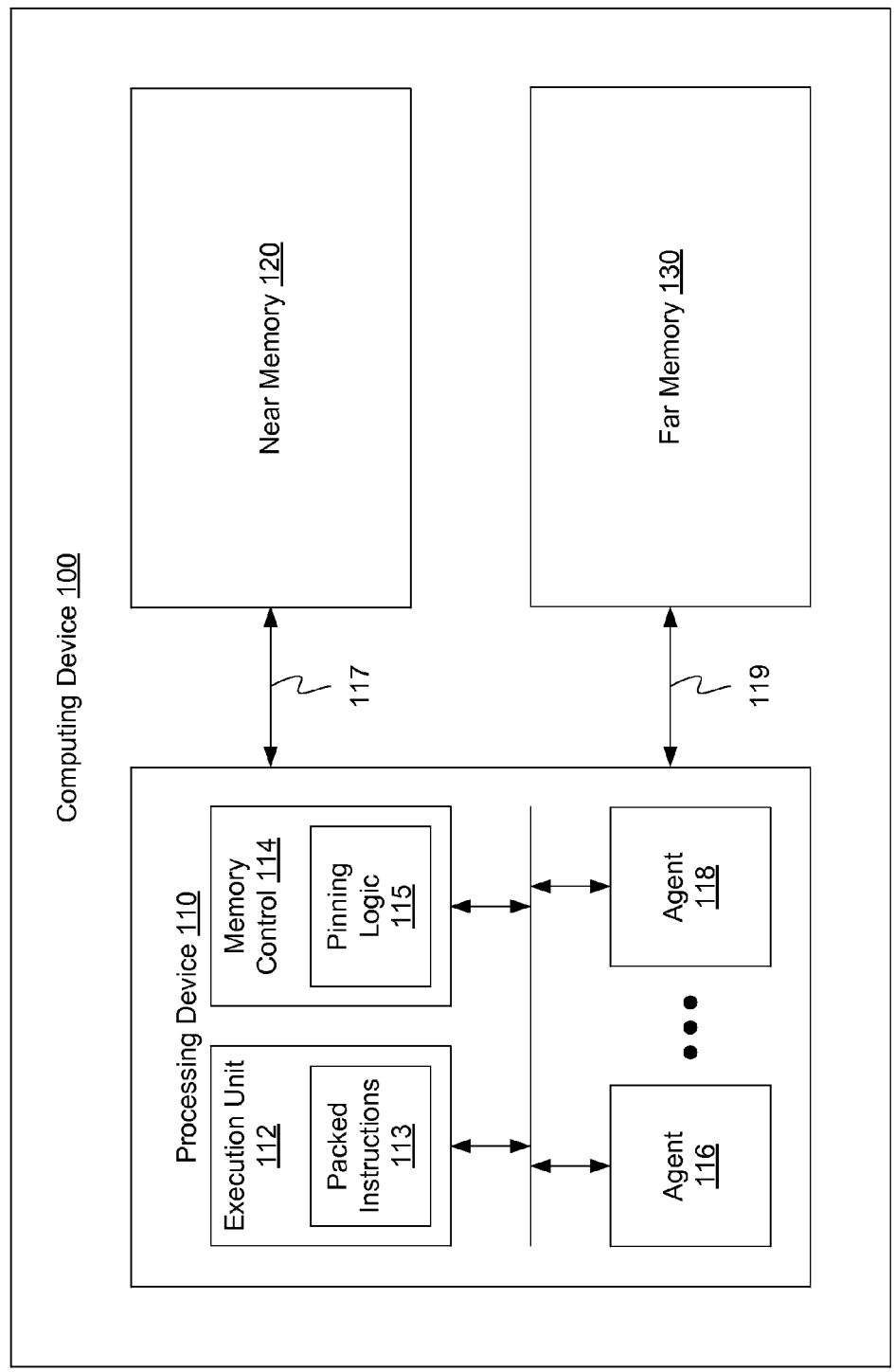
FIG. 1 is a block diagram illustrating a computing device with a processing device that performs isochronous agent data pinning in a multi-level memory system, according to an embodiment.

FIG. 1 is a block diagram illustrating a computing device with a processing device that performs isochronous agent data pinning in a multi-level memory system, according to an embodiment. In one embodiment, the computing device 100 includes processing device 110 and a multi-level memory system including near memory 120 and far memory 130. Computing device 100 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines that individually or jointly execute a set (or multiple sets) of instructions to perform any one or more of the methodologies discussed herein.

Processing device 110 may be, for example, a multi-core processor including multiple cores. These cores may be physical processors, and may include various components such as front end units, execution units and back end units. Processing device 110 may represent one or more general-purpose processing devices such as a microprocessor, central processing unit, or the like. Processing device 110 may implement a complex instruction set computing (CISC) architecture, a reduced instruction set computer (RISC) architecture, a very long instruction word (VLIW) architecture, or other instruction sets, or a combination of instruction sets, through translation of binary codes in the above mentioned instruction sets by a compiler. Processing device 110 may also be one or more special-purpose processing devices such as an application specific integrated circuit (ASIC), a field programmable gate array (FPGA), a digital signal processor (DSP), network processor, or the like. Processing device 110 may be configured to execute processing logic for performing the operations discussed herein.

Processing device 110 may employ execution units including logic to perform algorithms for process data, such as in the embodiments described herein. Processing device 110 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, computing device 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

In this illustrated embodiment, processing device 110 includes one or more execution units 112 to implement an algorithm that is to perform at least one instruction. One embodiment may be described in the context of a single processor desktop or server system, but alternative embodiments may be included in a multiprocessor system. The processing device 110 may be coupled to processor buses 117 and 119 that transmit data signals between the processing device 110 and other components in the device 100, such as near memory 120 and far memory 130.

Execution unit 112 including logic to perform integer and floating point operations, also resides in the processing device 110. The processing device 110, in one embodiment, includes a microcode (ucode) ROM to store microcode, which when executed, is to perform algorithms for certain macroinstructions or handle complex scenarios. Here, microcode is potentially updateable to handle logic bugs/fixes for processing device 110. For one embodiment, execution unit 112 includes logic to handle a packed instruction set 113. By including the packed instruction set 113 in the instruction set of a general-purpose processing device 110, along with associated circuitry to execute the instructions, the operations used by many multimedia applications may be performed using packed data in a general-purpose processing device 110. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

In one embodiment, processing device 110 includes a memory control unit or memory controller 114 which includes pinning logic 1154. In other embodiments, memory controller 114 may be referred to as a cache controller. Memory controller 114 many manage data access operations (e.g., read and write operations) for near memory 120 and far memory 130 on behalf of memory agents 116, 118.

Memory controller 114 may determine which data is to be stored in near memory 120, how long data is to be stored in near memory 120, when data is to be evicted from near memory 120, etc. In one embodiment, memory controller 114 includes pinning logic 115 to pin memory pages in the multi-level memory system upon request by one of memory agents 116, 118. For example, memory controller 114 may receive a pin request from memory agent 116 indicating a particular memory page (e.g., the framebuffer) that will be used by the memory agent 116. In response, memory controller 114 retrieves the memory page from far memory 130 and writes the memory page to near memory 120. Pinning logic 115 marks the memory page as pinned in near memory 120, for example, by setting a pinning bit corresponding to the memory page in a cache descriptor table managed by pinning logic 115. Marking the memory page as pinned prevents the memory page from being evicted from near memory 120 until the memory page is no longer in use by memory agent 116. Additional details of pinning logic 115 are provided below with respect to FIGS. 2A-6.

Memory agents 116, 118 may function as memory clients of the multi-level memory system, including near memory 120 and far memory 130. Memory agents 116, 118 may be drivers or engines that correspond to peripheral devices having a guaranteed performance requirement. That is, memory agents 116, 118 may have a minimum memory bandwidth or maximum data access latency in order for them to maintain normal operation without suffering any service interruptions. For example, memory agent 116 may be a display engine that includes electronic circuitry found in or associated with video or other graphics circuitry. The display engine may couple an image memory, such as display engine buffer, or other image source data to a display device such that video or image data is processed and properly formatted for the particular display device. The display engine may be used to convert image data that is retrieved from image memory into digital video or graphic display data that can ultimately be provided to the display device. The display device may include substantially any graphic display device along with its immediate circuitry. Examples of display devices include televisions, CRT devices, LCD display panels, LED display panels, mobile device display screens, consumer product display screens, OLED displays, projection displays, laser projection displays and 3-D display devices. The display device may be any output device used to present information for visual, and in some circumstances, tactile or audio reception. Other examples of memory agents 116, 118 include an imaging (camera) engine, a modem, an audio controller, or a manageability engine. In other embodiments, the memory agents 116 may be some other memory client.

The multi-level memory system including near memory 120 and far memory 130 may include a different types of memory, such as read-only memory (ROM), flash memory, dynamic random access memory (DRAM) (such as synchronous DRAM (SDRAM) or Rambus DRAM (RDRAM), etc.), or a static memory, such as flash memory, static random access memory (SRAM), etc. In other embodiments, the memory may include some other type of storage device for storing information in a form (e.g., software, processing application) readable by a machine (e.g., a computer). The storage device may include a machine-readable medium including, but not limited to, magnetic storage medium (e.g., floppy diskette), optical storage medium (e.g., CD-ROM), magneto-optical storage medium, erasable programmable memory (e.g., EPROM and EEPROM), flash memory; or another type of medium suitable for storing electronic instructions.

In one embodiment, near memory 120 includes dynamic random access memory (DRAM) to provide faster data access times than the far memory 130, while far memory 130 includes non-volatile random access memory (NVRAM) that is less expensive than the near memory 120. In one embodiment, the near memory 120 is utilized as a cache for the far memory 130. This nomenclature (i.e., "near" and "far" is based on relative performance of the memory (e.g., near memory 120 generally having lower latency and higher bandwidth than far memory 130). One factor in the effectiveness of the multi-level memory system is the amount of time that a given workload or set of workloads "hits" the near memory cache, in light of the performance characteristics of a near memory hit and the penalty incurred for a far memory transaction. The illustrated embodiment includes two memory levels (i.e. near memory 120 and far memory 130) in the multi-level memory system. It should be appreciated, however, that in other embodiments, the multi-level memory system may include some other number of memory levels.

Figure 2A:
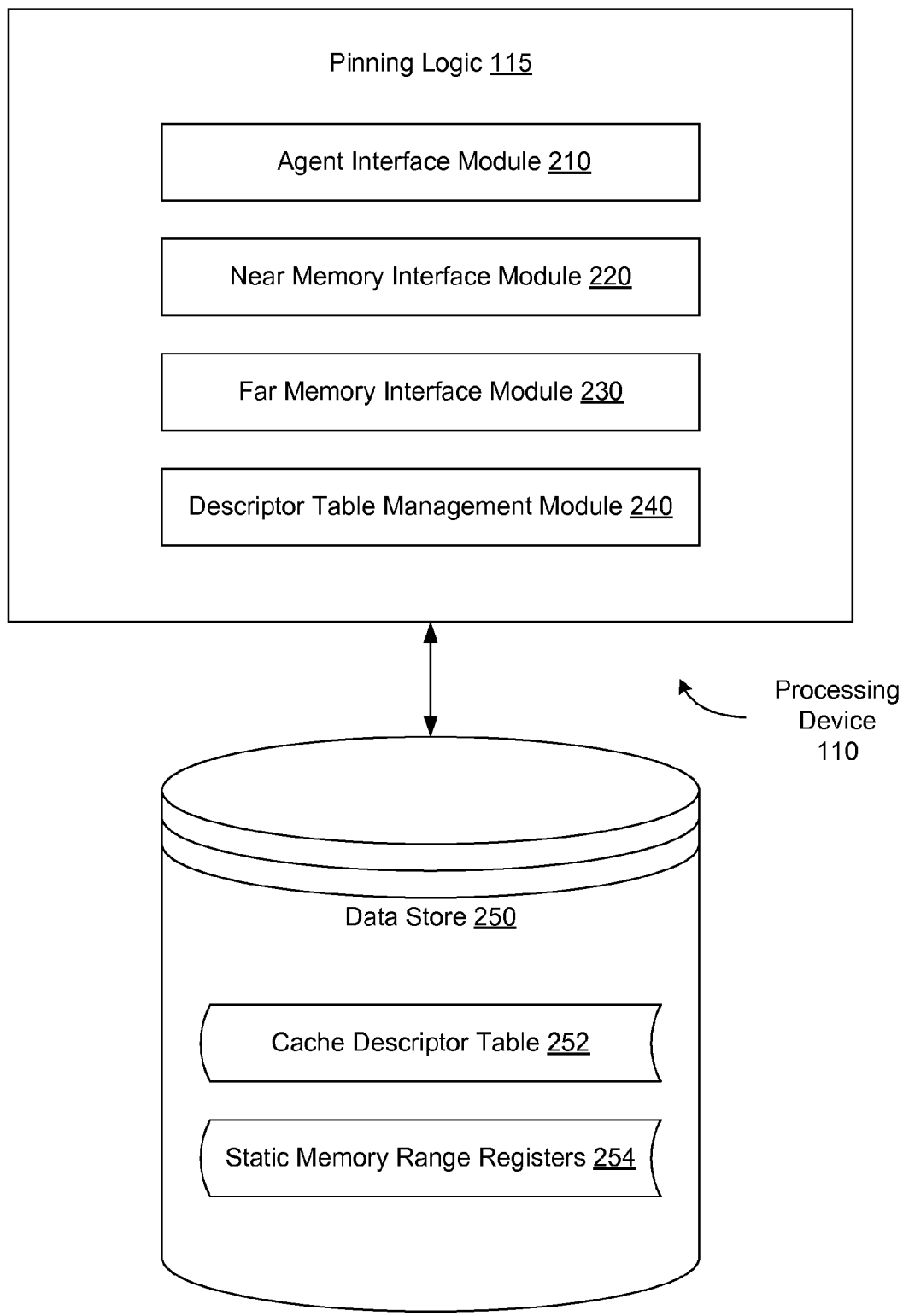
FIG. 2A is a block diagram illustrating pinning logic in a processing device, according to an embodiment.

FIG. 2A is a block diagram illustrating pinning logic in a processing device, according to an embodiment. In one embodiment, pinning logic 115 includes agent interface module 210, near memory interface module 220, far memory interface module 230 and descriptor table management module 240. This arrangement of modules and components may be a logical separation, and in other embodiments, these modules or other components can be combined together or separated in further components, according to a particular embodiment. In one embodiment, data store 250 is connected to pinning logic 115 and includes cache descriptor table 252 and static memory range registers 254. In one embodiment, processing device 110 may include both pinning logic 115A and data store 250. In another embodiment, data store 250 may be external to processing device 110 and may be connected to pinning logic 115 over a network or other connection. In other embodiments, processing device 110 may include different and/or additional components which are not shown to simplify the description. Data store 250 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, agent interface module 210 facilitates communication between pinning logic 115 and memory agents 116, 118. For example, agent interface module 210 may receive requests from memory agents 116, 118 such as a pinning request (see operation 201 in FIG. 2B) or a page request (see operation 206 in FIG. 2B). Agent interface module 210 may also send communications back to memory agents 116, 118, such as confirmation that a given memory page has been pinned in near memory 120 (see operation 205 in FIG. 2B) or sending the actual requested memory page to memory agents 116, 118 (see operation 208 in FIG. 2B).

In one embodiment, near memory interface module 220 handles data transfer and management of near memory 120. For example, near memory interface module 220 may check to determine whether a requested memory page is present in near memory 120, write received data to near memory 120 (see operation 204 in FIG. 2B) and retrieve a requested memory page from near memory 120 (see operation 207 in FIG. 2B). In addition, near memory interface module 220 may handle evictions of memory pages from near memory 120. In one embodiment, near memory 120 may apply a cache eviction policy, such as least-recently used (LRU), most recently used, least frequently used, random replacement, or some other policy, to determine which memory page to evict from near memory 120 when space is limited. Near memory interface module 220 may also prevent memory pages which are marked as pinned from being evicted from near memory 120.

In one embodiment, far memory interface module 230 handles data transfer and management of far memory 130. For example, far memory interface module 230 may check to determine whether a requested memory page is present in far memory 130 and retrieve a requested memory page from far memory 130 (see operation 203 in FIG. 2B).

In one embodiment, descriptor table management module 240 manages cache descriptor table 252. In one embodiment, cache descriptor table 252 can be used to store metadata about the memory pages currently or previously stored in near memory 120. Upon a memory page being added to near memory 120, descriptor table management module 240 may check for the existence of a corresponding entry in cache descriptor table 252 and if no corresponding entry is found, create a new entry. In one embodiment, each entry in cache descriptor table 252 may include a unique identifier associated with the corresponding memory page, a physical address or address range in memory where the corresponding memory page may be located, an indication of whether the memory page is currently valid or dirty (i.e., a more updated version is available in far memory 130), and a pinning bit to indicate whether the memory page has been pinned. In one embodiment, descriptor table management module 240 may set the pinning bit in an entry to a certain value (e.g., logic "1") when a request to pin the corresponding memory page is received (see operation 202 in FIG. 2B). When a request to unpin the memory page is received, descriptor table management module 240 may clear the pinning bit (e.g., logic "0"). In other embodiments, some other indication may be used in cache descriptor table to signify when a memory page has been pinned.

In one embodiment, descriptor table management module 240 also manages static memory range registers. In one embodiment, static memory range registers 254 may be loaded with physical memory address ranges at boot time of computing device 100 that indicate certain memory pages which should be pinned upon their being loaded into near memory 120. In this embodiment, agent interface module 210 may not receive a specific pinning request, but rather when a page request is received for a memory page residing at a memory address covered by the range of memory addresses stored in static memory range registers 254, descriptor table management module 240 automatically marks the memory page as pinned in cache descriptor table 252. The memory page may remained pinned until computing device 100 is rebooted and cache descriptor table 252 and static memory range registers 254 are cleared.

Figure 3:
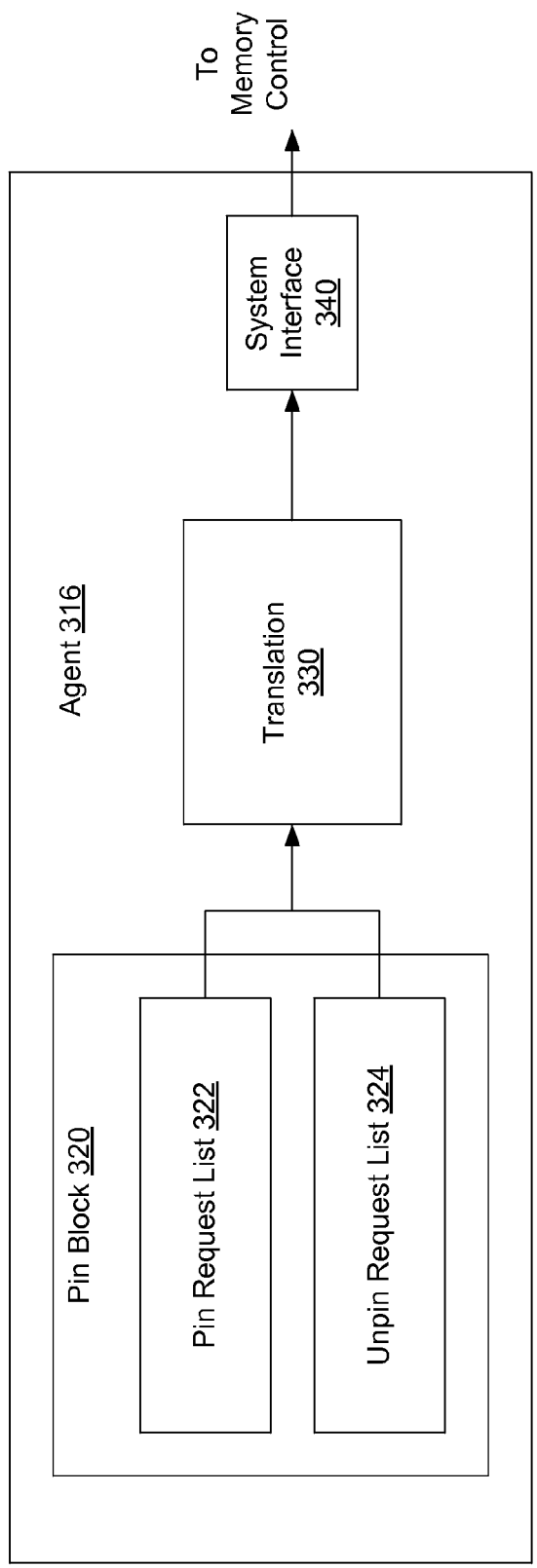
FIG. 3 is a block diagram illustrating an isochronous memory agent that performs data pinning in a multi-level memory system, according to an embodiment.

FIG. 3 is a block diagram illustrating an isochronous memory agent that performs data pinning in a multi-level memory system, according to an embodiment. In one embodiment, memory agent 316 is representative of memory agents 116, 118 as shown in FIG. 1. In one embodiment, memory agent 316 includes pin block 320, translation block 330 and system interface 340. Pin block 320 may include a pin request list 322 and an unpin request list 324. In one embodiment, a peripheral device driver (not shown) provides agent 316 with a list of a memory pages that are to be pinned or unpinned. These memory pages may be pages that are being utilized or will be utilized by the corresponding peripheral device (e.g., a framebuffer for a display). Pin block 320 may store an indication (e.g., a guest virtual address) of these memory pages in the pin request list 322 or unpin request list 324, as appropriate. In one embodiment, pin block 320, further includes a state machine (not shown) that feeds the indicators in pin request list 322 and unpin request list 324 to translation block 330.

Translation block 330 may include, for example, a translation lookaside buffer (TLB) used to improve virtual address translation speeds. In one embodiment, the TLB is implemented as content-addressable memory (CAM). The virtual address of the memory page is used as a CAM search key and the search result is a physical memory address. If the requested address is present in the TLB, the CAM search yields a match quickly and the retrieved physical address can be used to access memory. This may be referred to as a TLB hit. If the requested address is not in the TLB (i.e., a TLB miss), translation block 330 may proceed by looking up the page table in a process called a page walk. The page walk may include reading the contents of multiple memory locations and using them to compute the physical address of the corresponding page in memory. After the physical address is determined by the page walk, the virtual address to physical address mapping may be entered into the TLB. Translation block 330 may provide the determined host physical address to system interface 340, which can forward the address to memory control unit 112 for pinning or unpinning by pinning logic 115, as described herein.

Figure 2B:
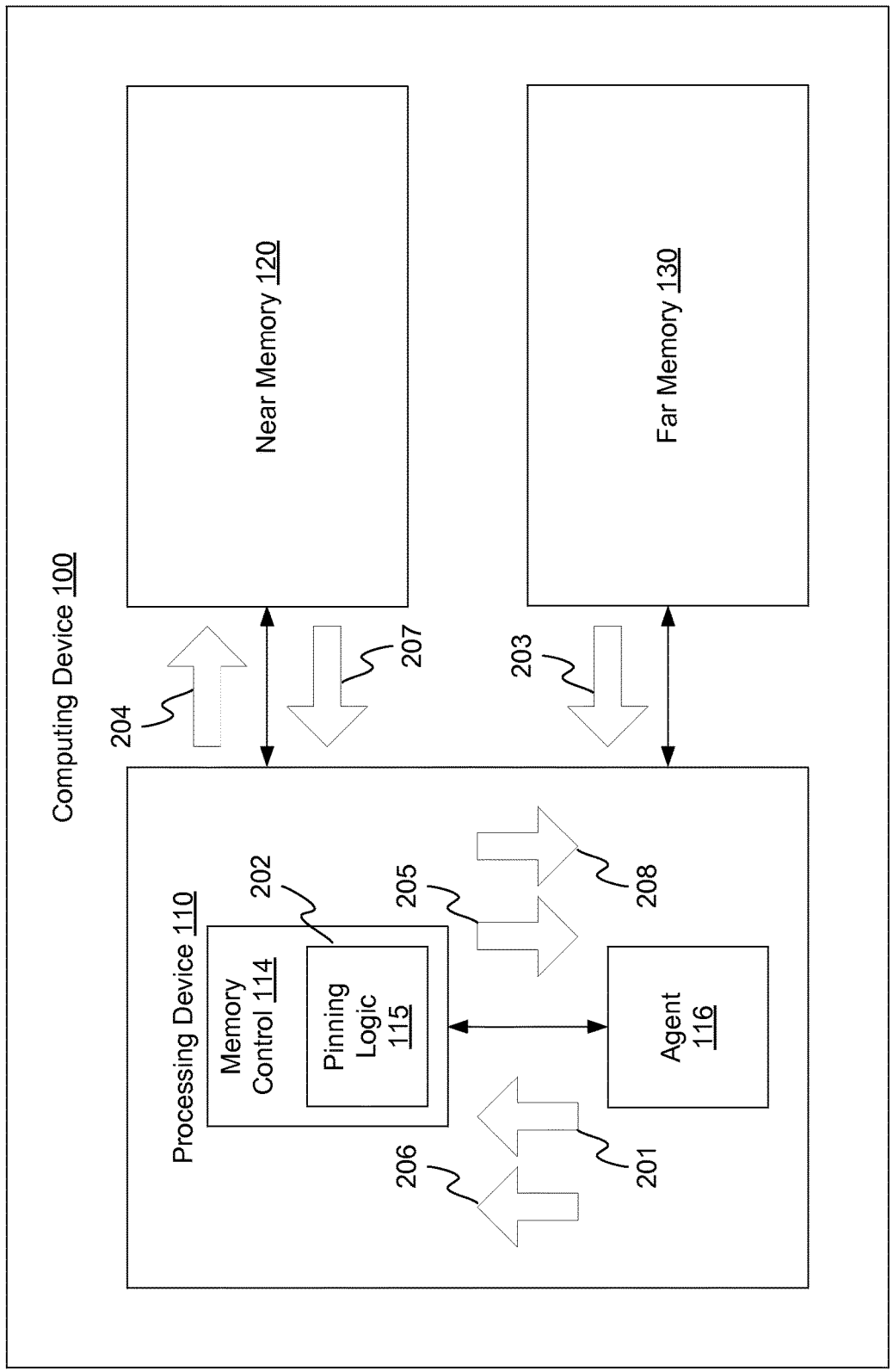
FIG. 2B is a block diagram illustrating a data flow for isochronous agent data pinning in a multi-level memory system, according to an embodiment.
Figure 4:
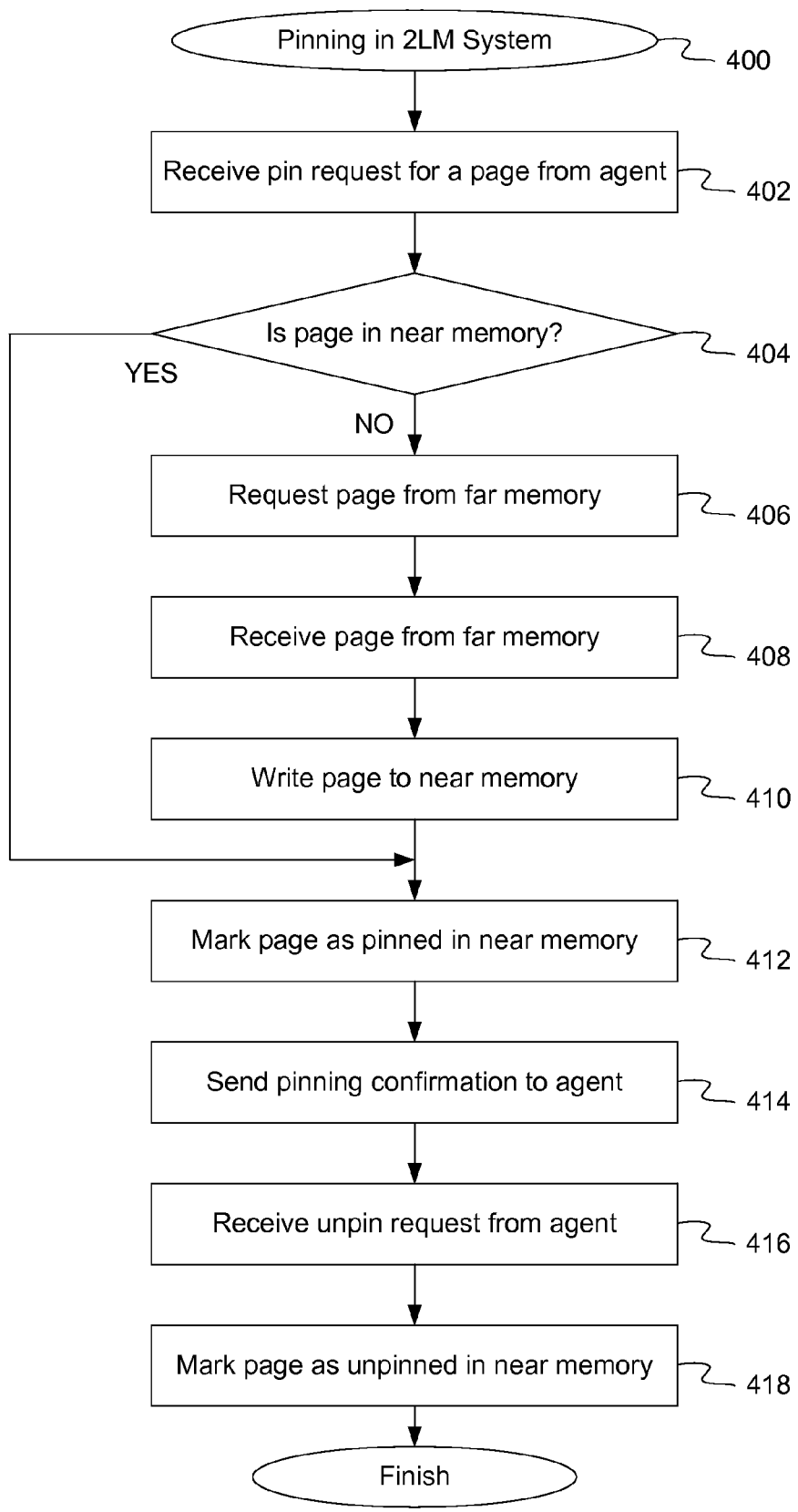
FIG. 4 is a flow diagram illustrating a method for isochronous agent data pinning in a multi-level memory system, according to an embodiment.

FIG. 4 is a flow diagram illustrating a method for isochronous agent data pinning in a multi-level memory system, according to an embodiment. The method 400 may be performed by processing logic that may comprise hardware (e.g., circuitry, dedicated logic, programmable logic, microcode, etc.), software (e.g., instructions run on a processing device to perform hardware simulation), or a combination thereof. The processing logic may pin memory pages in a near memory to prevent eviction of the memory pages while still in use of a memory client. In one embodiment, the method 400 is performed by pinning logic 115, as shown in FIGS. 1, 2A and 2B.

Referring to FIG. 4, at block 402, method 400 receives a pin request indicating a memory page from a memory client in a multi-level memory system. In one embodiment, agent interface module 210 receives the request from one of memory agents 116, 118. The request may be received when the memory agent needs or will need the requested memory page in order to complete an operation (e.g., output an image on a display).

At block 404, method 400 determines whether the requested memory page is in a near memory in the multi-level memory system. In one embodiment, near memory interface module 220 may check to determine whether a requested memory page is present in near memory 120. For example, each memory page may be identified using a unique identifier (e.g., platform address). The request may include this unique identifier, and in response near memory interface module 220 may scan the contents of near memory 120 to check for the presence of the corresponding memory page.

If the memory page is found in near memory, method 400 may proceed to block 412. If the memory page is not in the near memory, at block 406, method 400 requests the memory page from a far memory in the multi-level memory system. In one embodiment, far memory interface module 230 handles data transfer and management of far memory 130. For example, far memory interface module 230 may check to determine whether a requested memory page is present in far memory 130 and retrieve the requested memory page from far memory 130.

At block 408, method 400 receives the requested memory page from the far memory and at block 410, method 400 writes the memory page to the near memory. In one embodiment, far memory interface module 230 receives the requested memory page from far memory 130 and provides the memory page to near memory interface module 220. Near memory interface module 220 may write received data to near memory 120.

At block 412, method 400 marks the memory page as pinned in the near memory. In one embodiment, descriptor table management module 240 manages cache descriptor table 252. Cache descriptor table 252 can be used to store metadata about the memory pages currently or previously stored in near memory 120. Upon a memory page being added to near memory 120, descriptor table management module 240 may check for the existence of a corresponding entry in cache descriptor table 252 and if no corresponding entry is found, create a new entry. In one embodiment, each entry in cache descriptor table 252 may include a pinning bit to indicate whether the memory page has been pinned. In one embodiment, descriptor table management module 240 may set the pinning bit in an entry to a certain value (e.g., logic "1") when a request to pin the corresponding memory page is received.

At block 414, method 400 sends a pinning confirmation message to the memory agent. Agent interface module 210 may send communications back to memory agents 116, 118, such as confirmation that a given memory page has been pinned in near memory 120.

At block 416, method 400 receives an unpin request from the memory agent indicating the memory page pinned in the near memory. The unpin request may be received when memory agent 116, 118 has completed processing using the pinned memory page and/or will not be using the pinned memory page for some period of time. At block 418, method 400 marks the memory page as unpinned in the near memory. When a request to unpin the memory page is received, descriptor table management module 240 may clear the pinning bit (e.g., by setting the value of the pinning bit in cache descriptor table 252 to logic "0").

Figure 5:
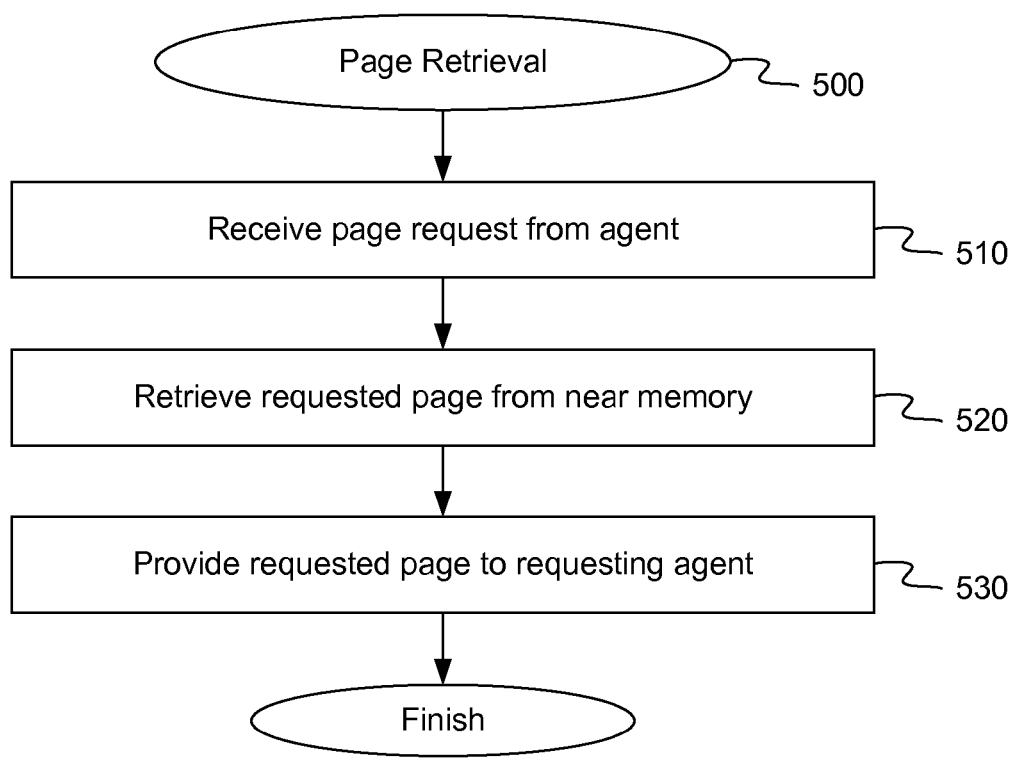
FIG. 5 is a flow diagram illustrating a method for memory page retrieval in a multi-level memory system, according to an embodiment.

FIG. 5 is a flow diagram illustrating a method for memory page retrieval in a multi-level memory system, according to an embodiment. The method 500 may be performed by processing logic that may comprise hardware (e.g., circuitry, dedicated logic, programmable logic, microcode, etc.), software (e.g., instructions run on a processing device to perform hardware simulation), or a combination thereof. The processing logic may retrieve a pinned memory page from the near memory in response a request from the memory agent. In one embodiment, the method 500 is performed by pinning logic 115, as shown in FIGS. 1, 2A and 2B.

Referring to FIG. 5, at block 510, method 500 receives a page request from a memory agent. In one embodiment, agent interface module 210 receives the page request from one of memory agents 116, 118. The request may be received when the memory agent needs or will need the requested memory page in order to complete an operation and after the memory agent 116, 118 has already made a pinning request and received a pinning confirmation message from agent interface module 210.

At block 520, method 500 retrieves the requested memory page from the near memory. In one embodiment, near memory interface module 220 may retrieve the requested memory page from near memory 120. At block 530, method 500 provides the requested memory page to the memory agent. In one embodiment, agent interface module 210 provides the requested memory page to memory agent 116, 118.

Figure 6:
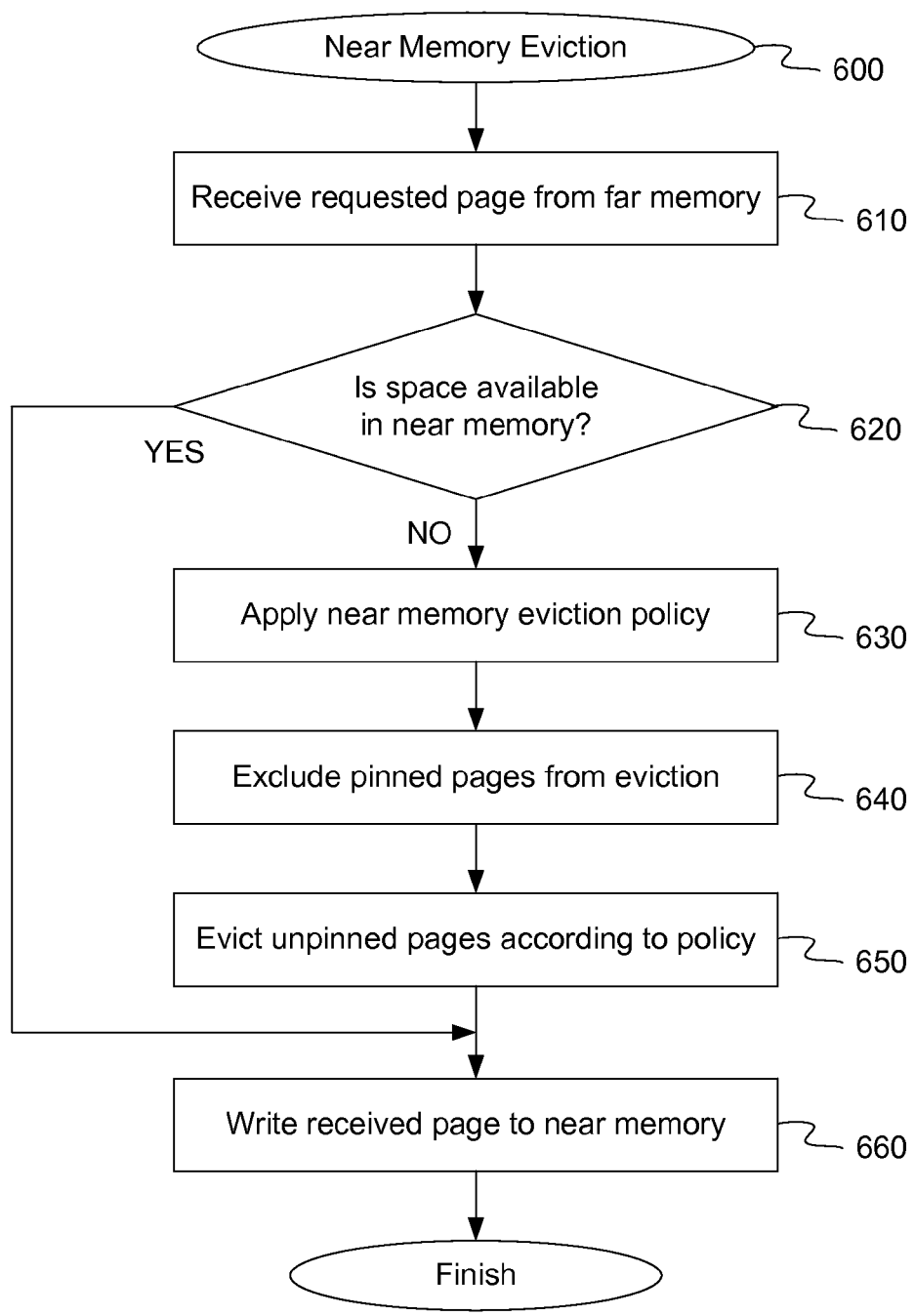
FIG. 6 is a flow diagram illustrating a method for memory page eviction in a multi-level memory system with pinning, according to an embodiment.

FIG. 6 is a flow diagram illustrating a method for memory page eviction in a multi-level memory system with pinning, according to an embodiment. The method 600 may be performed by processing logic that may comprise hardware (e.g., circuitry, dedicated logic, programmable logic, microcode, etc.), software (e.g., instructions run on a processing device to perform hardware simulation), or a combination thereof. The processing logic may retrieve a pinned memory page from the near memory in response a request from the memory agent. In one embodiment, the method 600 is performed by pinning logic 115, as shown in FIGS. 1, 2A and 2B.

Referring to FIG. 6, at block 610, method 600 receives a requested memory page from far memory in a multi-level memory system. In one embodiment, far memory interface module 230 retrieves the memory page from far memory 130 and provides the memory page to near memory interface module 220.

At block 620, method 600 determines whether space is available in the near memory. In one embodiment, near memory interface module 220 compares the size of the received memory page to an amount of available space in near memory 120.

If insufficient space is available in the near memory, at block 630, method 600 applies a near memory eviction policy to the data in the near memory. The eviction policy may be a cache eviction policy, such as least-recently used (LRU), most recently used, least frequently used, random replacement, or some other policy, to determine which memory page to evict from near memory 120.

At block 640, method 600 excludes the pinned memory pages in the near memory from eviction. In one embodiment, near memory interface module 220 queries descriptor table management module 240 to determine whether the memory pages identified as a result of the cache eviction policy at block 630 are pinned memory pages. Near memory interface module 220 may consult cache descriptor table 252 to determine whether the pinning bit corresponding to a given memory page is set (i.e., marked as pinned). If the pinning bit is set, near memory interface module 220 refrains from evicting the pinned memory page and moves on to a next memory page identified by the cache eviction policy.

At block 650, method 600 evicts at least one unpinned memory page from the near memory according to the eviction policy and at block 660, method 600 writes the memory page received at block 610 to the near memory 120 since space in near memory 120 is now available.

Figure 7:
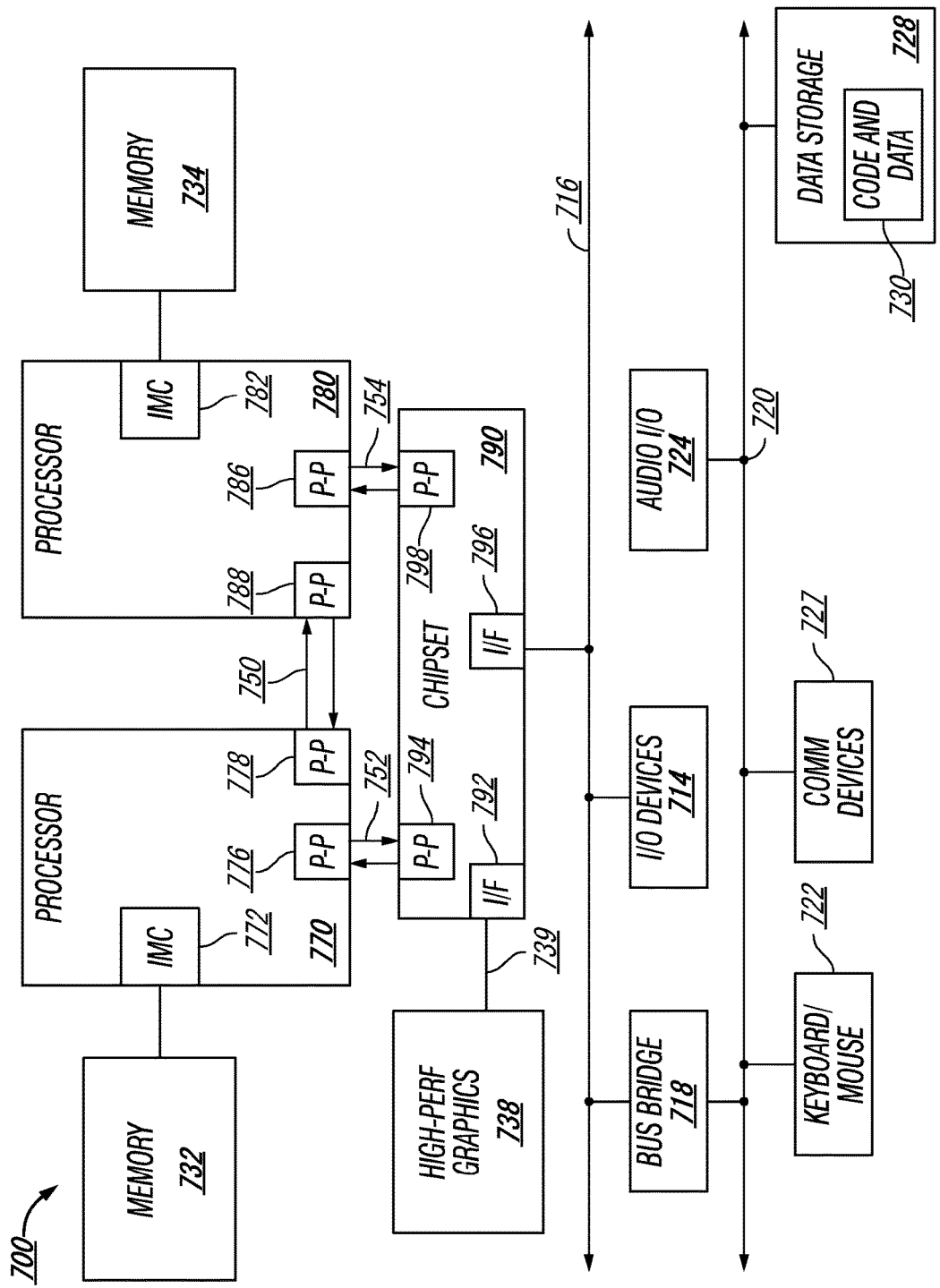
FIG. 7 is a block diagram of a computer system, according to an embodiment.

Referring now to FIG. 7, shown is a block diagram of a system 700 in accordance with an embodiment. As shown in FIG. 7, multiprocessor system 700 is a point-to-point interconnect system, and includes a first processor 770 and a second processor 780 coupled via a point-to-point interconnect 750. Each of processors 770 and 780 may be some version of the processing device 110, as shown in FIG. 1.

While shown with only two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770 and 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
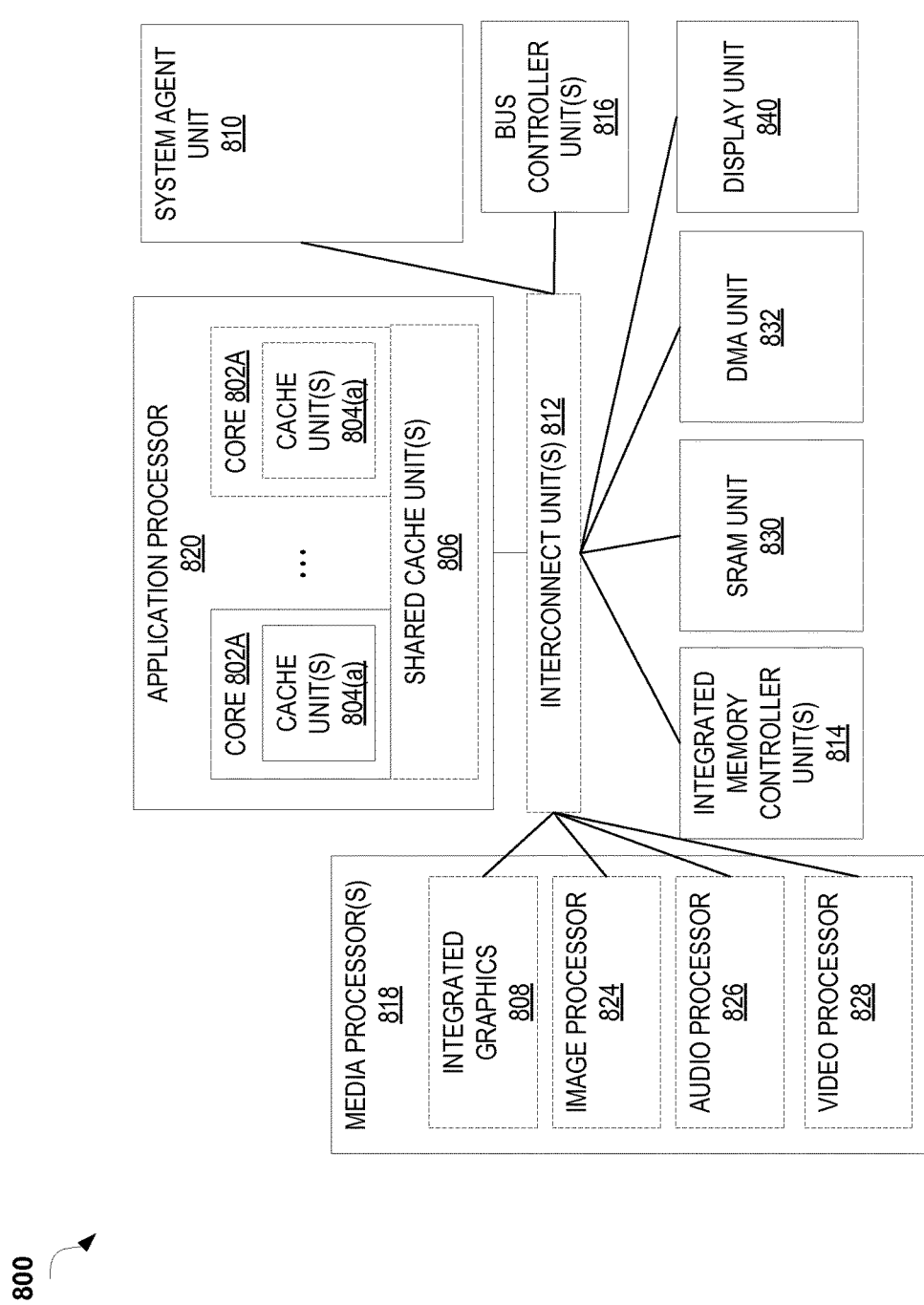
FIG. 8 is a block diagram of a system on chip (SoC) in accordance with an embodiment of the present disclosure.

Embodiments may be implemented in many different system types. FIG. 8 is a block diagram of a SoC 800 in accordance with an embodiment of the present disclosure. Dashed lined boxes are optional features on more advanced SoCs. In FIG. 8, an interconnect unit(s) 812 is coupled to: an application processor 820 which includes a set of one or more cores 802A-N and shared cache unit(s) 806; a system agent unit 810; a bus controller unit(s) 816; an integrated memory controller unit(s) 814; a set or one or more media processors 818 which may include integrated graphics logic 808, an image processor 824 for providing still and/or video camera functionality, an audio processor 826 for providing hardware audio acceleration, and a video processor 828 for providing video encode/decode acceleration; an static random access memory (SRAM) unit 830; a direct memory access (DMA) unit 832; and a display unit 840 for coupling to one or more external displays. In one embodiment, a memory module may be included in the integrated memory controller unit(s) 814. In another embodiment, the memory module may be included in one or more other components of the SoC 800 that may be used to access and/or control a memory. The application processor 820 may include a microcode context and aliased parameter passing logic as described in embodiments herein.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. In some embodiments, one or more of the cores 802A-N are capable of multi-threading.

The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture and/or instruction set. For example, some of the cores 802A-N may be in order while others are out-of-order. As another example, two or more of the cores 802A-N may be capable of execution the same instruction set, while others may be capable of executing only a subset of that instruction set or a different instruction set.

The application processor 820 may be a general-purpose processor, such as a Core™ i3, i5, i7, 2 Duo and Quad, Xeon™, Itanium™, XScale™ or StrongARM™ processor, which are available from Intel™ Corporation, of Santa Clara, Calif. Alternatively, the application processor 820 may be from another company, such as ARM Holdings™, Ltd, MIPS™, etc. The application processor 820 may be a special-purpose processor, such as, for example, a network or communication processor, compression engine, graphics processor, co-processor, embedded processor, or the like. The application processor 820 may be implemented on one or more chips. The application processor 820 may be a part of and/or may be implemented on one or more substrates using any of a number of process technologies, such as, for example, BiCMOS, CMOS, or NMOS.

Figure 9:
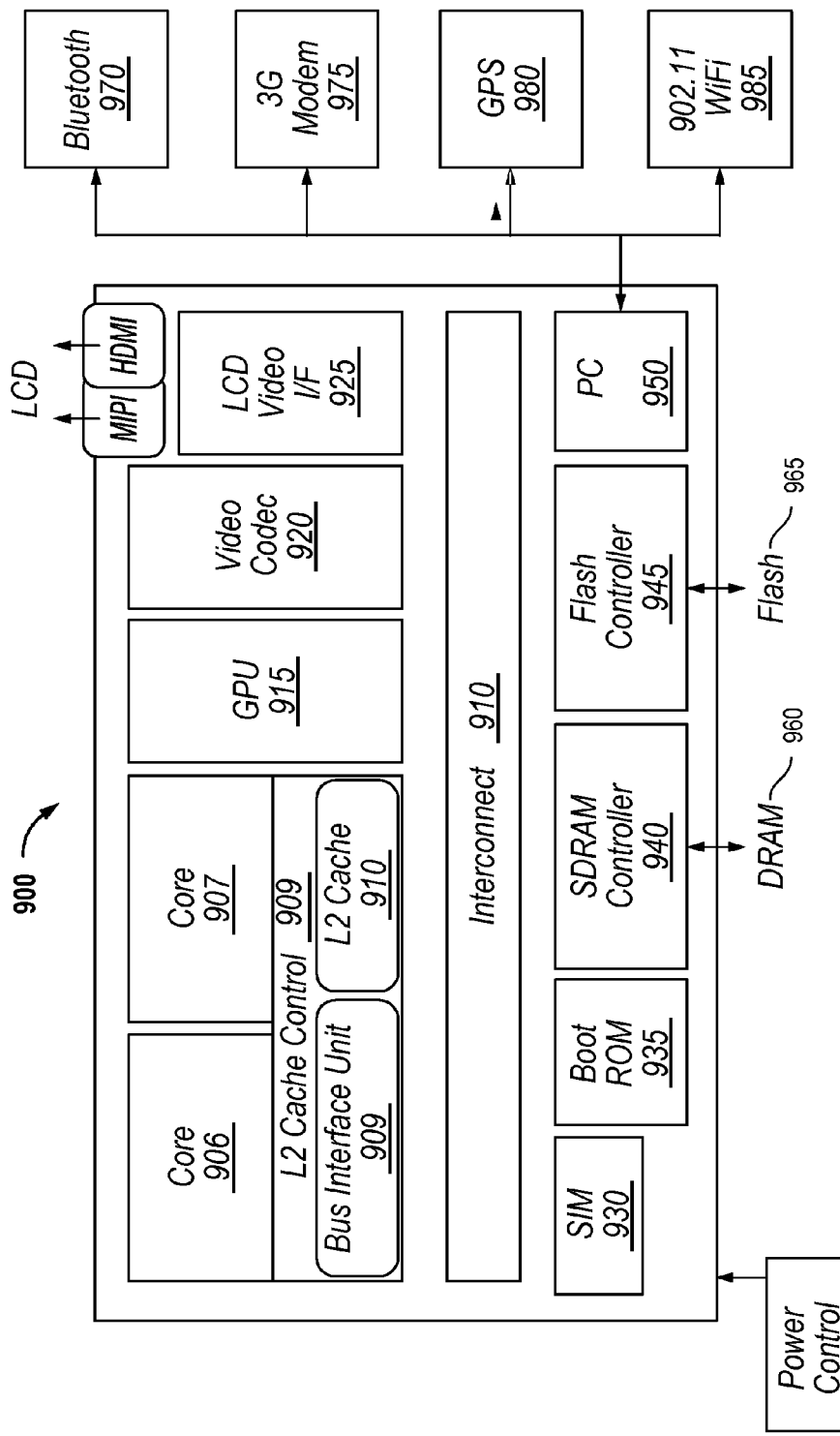
FIG. 9 is a block diagram of an embodiment of a system on-chip (SOC) design.

FIG. 9 is a block diagram of an embodiment of a system on-chip (SoC) design in accordance with the present disclosure. As a specific illustrative example, SoC 900 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 900 includes two cores—906 and 907. Cores 906 and 907 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 906 and 907 are coupled to cache control 908 that is associated with bus interface unit 909 and L2 cache 910 to communicate with other parts of system 900. Interconnect 910 includes an on-chip interconnect, such as an IOSF, AMBA, or other interconnect discussed above, which potentially implements one or more aspects of the described disclosure. In one embodiment, a microcode context and aliased parameter passing logic may be included in cores 906, 907.

Interconnect 910 provides communication channels to the other components, such as a Subscriber Identity Module (SIM) 930 to interface with a SIM card, a boot ROM 935 to hold boot code for execution by cores 906 and 907 to initialize and boot SoC 900, a SDRAM controller 940 to interface with external memory (e.g. DRAM 960), a flash controller 945 to interface with non-volatile memory (e.g. Flash 965), a peripheral control 950 (e.g. Serial Peripheral Interface) to interface with peripherals, video codecs 920 and Video interface 925 to display and receive input (e.g. touch enabled input), GPU 915 to perform graphics related computations, etc. Any of these interfaces may incorporate aspects of the disclosure described herein. In addition, the system 900 illustrates peripherals for communication, such as a Bluetooth module 970, 3G modem 975, GPS 980, and Wi-Fi 985.

Figure 10:
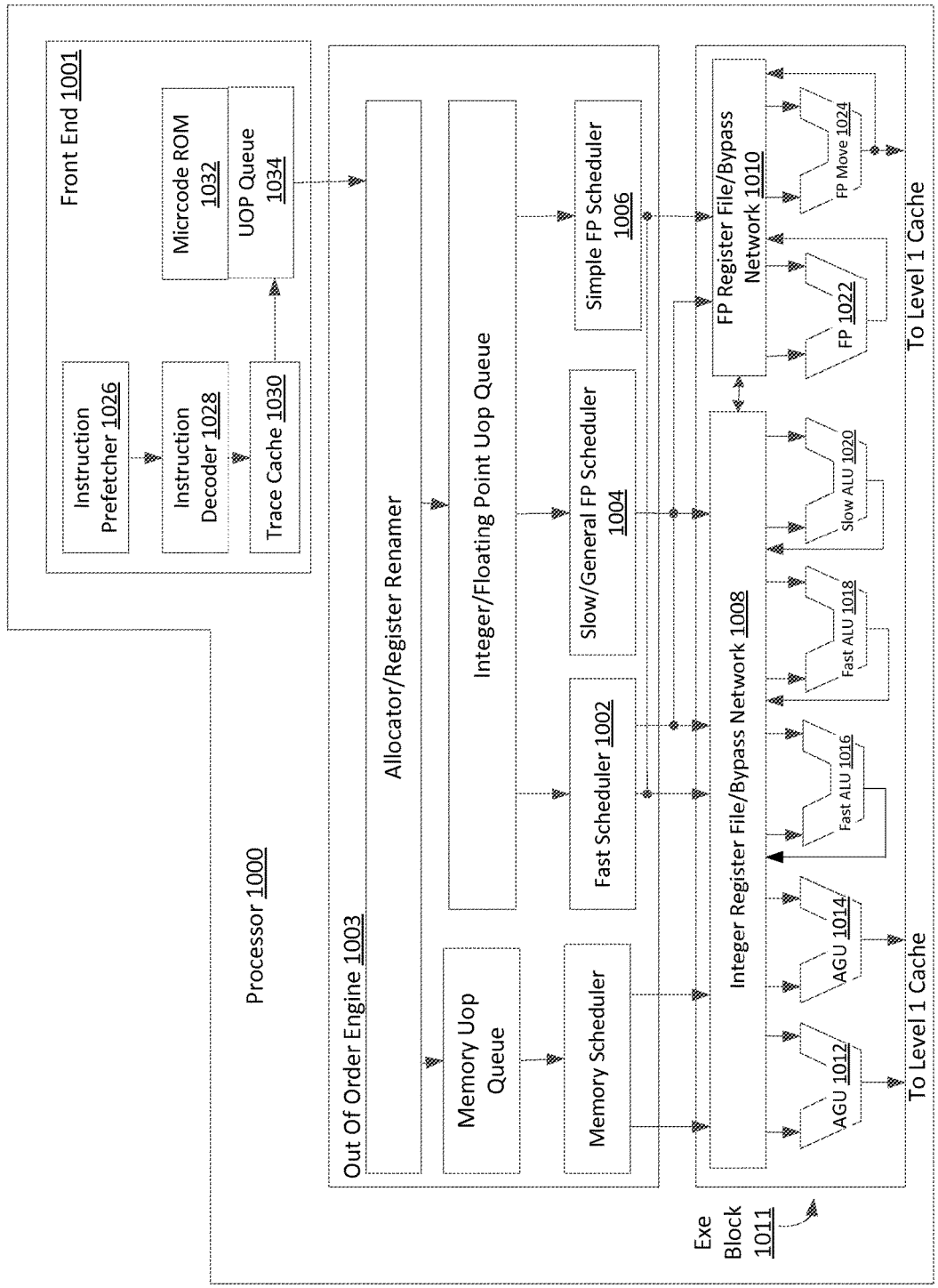
FIG. 10 illustrates a block diagram of the micro-architecture for a processor in accordance with one embodiment of the disclosure.

FIG. 10 is a block diagram of the micro-architecture for a processor 1000 that includes logic circuits to perform instructions in accordance with one embodiment. The processor 1000 may be one example of the processing device 110, described above with respect to FIG. 1. In some embodiments, an instruction in accordance with one embodiment can be implemented to operate on data elements having sizes of byte, word, doubleword, quadword, etc., as well as datatypes, such as single and double precision integer and floating point datatypes. In one embodiment, the in-order front end 1001 is the part of the processor 1000 that fetches instructions to be executed and prepares them to be used later in the processor pipeline. The front end 1001 may include several units. In one embodiment, the instruction prefetcher 1026 fetches instructions from memory and feeds them to an instruction decoder 1028 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1030 takes decoded uops and assembles them into program ordered sequences or traces in the uop queue 1034 for execution. When the trace cache 1030 encounters a complex instruction, the microcode ROM 1032 provides the uops needed to complete the operation.

Some instructions are converted into a single micro-op, whereas others need several micro-ops to complete the full operation. In one embodiment, if more than four micro-ops are needed to complete an instruction, the decoder 1028 accesses the microcode ROM 1032 to do the instruction. For one embodiment, an instruction can be decoded into a small number of micro ops for processing at the instruction decoder 1028. In another embodiment, an instruction can be stored within the microcode ROM 1032 should a number of micro-ops be needed to accomplish the operation. The trace cache 1030 refers to an entry point programmable logic array (PLA) to determine a correct micro-instruction pointer for reading the micro-code sequences to complete one or more instructions in accordance with one embodiment from the micro-code ROM 1032. After the microcode ROM 1032 finishes sequencing micro-ops for an instruction, the front end 1001 of the machine resumes fetching micro-ops from the trace cache 1030.

The out-of-order execution engine 1003 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1002, slow/general floating point scheduler 1004, and simple floating point scheduler 1006. The uop schedulers 1002, 1004, 1006, determine when a uop is ready to execute based on the readiness of their dependent input register operand sources and the availability of the execution resources the uops need to complete their operation. The fast scheduler 1002 of one embodiment can schedule on each half of the main clock cycle while the other schedulers can only schedule once per main processor clock cycle. The schedulers arbitrate for the dispatch ports to schedule uops for execution.

Register files 1008, 1010, sit between the schedulers 1002, 1004, 1006, and the execution units 1012, 1014, 1016, 1018, 1020, 1022, 1024 in the execution block 1011. There is a separate register file 1008, 1010, for integer and floating point operations, respectively. Each register file 1008, 1010, of one embodiment also includes a bypass network that can bypass or forward just completed results that have not yet been written into the register file to new dependent uops. The integer register file 1008 and the floating point register file 1010 are also capable of communicating data with the other. For one embodiment, the integer register file 1008 is split into two separate register files, one register file for the low order 32 bits of data and a second register file for the high order 32 bits of data. The floating point register file 1010 of one embodiment has 128 bit wide entries because floating point instructions typically have operands from 64 to 128 bits in width.

The execution block 1011 contains the execution units 1012, 1014, 1016, 1018, 1020, 1022, 1024, where the instructions are actually executed. This section includes the register files 1008, 1010, that store the integer and floating point data operand values that the micro-instructions need to execute. The processor 1000 of one embodiment is comprised of a number of execution units: address generation unit (AGU) 1012, AGU 1014, fast ALU 1016, fast ALU 1018, slow ALU 1020, floating point ALU 1022, floating point move unit 1024. For one embodiment, the floating point execution blocks 1022, 1024, execute floating point, MMX, SIMD, and SSE, or other operations. The floating point ALU 1022 of one embodiment includes a 64 bit by 64 bit floating point divider to execute divide, square root, and remainder micro-ops. For some embodiments, instructions involving a floating point value may be handled with the floating point hardware. In one embodiment, the ALU operations go to the high-speed ALU execution units 1016, 1018. The fast ALUs 1016, 1018, of one embodiment can execute fast operations with an effective latency of half a clock cycle. For one embodiment, most complex integer operations go to the slow ALU 1020 as the slow ALU 1020 includes integer execution hardware for long latency type of operations, such as a multiplier, shifts, flag logic, and branch processing. Memory load/store operations are executed by the AGUs 1012, 1014. For one embodiment, the integer ALUs 1016, 1018, 1020, are described in the context of performing integer operations on 64 bit data operands. In alternative embodiments, the ALUs 1016, 1018, 1020, can be implemented to support a variety of data bits including 16, 32, 128, 256, etc. Similarly, the floating point units 1022, 1024, can be implemented to support a range of operands having bits of various widths. For one embodiment, the floating point units 1022, 1024, can operate on 128 bits wide packed data operands in conjunction with SIMD and multimedia instructions.

In one embodiment, the uops schedulers 1002, 1004, 1006, dispatch dependent operations before the parent load has finished executing. As uops are speculatively scheduled and executed in processor 1000, the processor 1000 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 11:
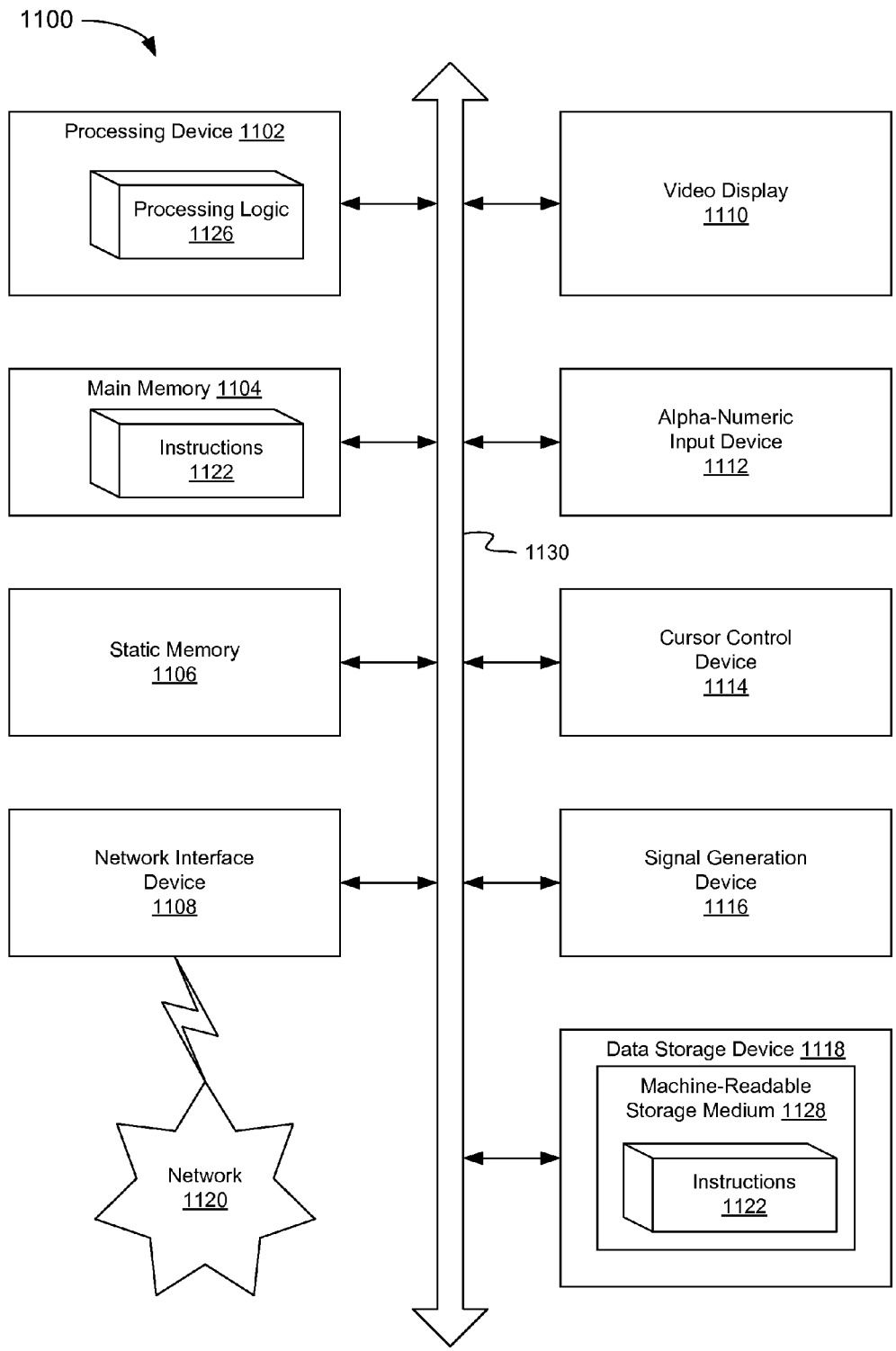
FIG. 11 is a block diagram illustrating an exemplary computer system, according to some implementations.

FIG. 11 illustrates a diagrammatic representation of a machine in the exemplary form of a computer system 1100 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 1100 may be representative of computing device 100 including processing device 110, as described above.

The exemplary computer system 1100 includes a processing device 1102, a main memory 1104 (e.g., read-only memory (ROM), flash memory, dynamic random access memory (DRAM) (such as synchronous DRAM (SDRAM) or Rambus DRAM (RDRAM), etc.), a static memory 1106 (e.g., flash memory, static random access memory (SRAM), etc.), and a data storage device 1118, which communicate with each other via a bus 1130. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute processing logic 1126 for performing the operations and steps discussed herein.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a machine-readable storage medium 1128, on which is stored one or more set of instructions 1122 (e.g., software) embodying any one or more of the methodologies of functions described herein. The instructions 1122 may also reside, completely or at least partially, within the main memory 1104 and/or within the processing device 1102 during execution thereof by the computer system 1100; the main memory 1104 and the processing device 1102 also constituting machine-readable storage media. The instructions 1122 may further be transmitted or received over a network 1120 via the network interface device 1108.

The machine-readable storage medium 1128 may also be used to store instructions to perform a method for isochronous agent data pinning in a multi-level memory system, as described herein. While the machine-readable storage medium 1128 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The following examples pertain to further embodiments.

Example 1 is a processing device comprising: 1) an instruction execution unit; 2) a memory agent; and 3) a memory control unit comprising pinning logic to pin memory pages in a multi-level memory system upon request by the memory agent, the pinning logic comprising an agent interface module to receive, from the memory agent, a pin request indicating a first memory page in the multi-level memory system, the multi-level memory system comprising a near memory and a far memory, a memory interface module to retrieve the first memory page from the far memory and write the first memory page to the near memory, and a descriptor table management module to mark the first memory page as pinned in the near memory, wherein marking the first memory page as pinned comprises setting a pinning bit corresponding to the first memory page in a cache descriptor table and to prevent the first memory page from being evicted from the near memory when the first memory page is marked as pinned.

In Example 2, for the processing device of Example 1, the near memory can optionally comprise dynamic random access memory (DRAM) to provide faster data access times than the far memory.

In Example 3, for the processing device of Example 1, the far memory can optionally comprise non-volatile random access memory (NVRAM) that is less expensive than the near memory.

In Example 4, for the processing device of Example 1, the memory agent can optionally comprise a peripheral device management engine having a guaranteed performance requirement.

In Example 5, for the processing device of Example 1, the memory control unit can further receive, from the memory agent, a page request for the first memory page, retrieve the first memory page from the near memory, and provide the first memory page to the memory agent.

In Example 6, for the processing device of Example 1, to prevent the first memory page from being evicted from the near memory, the descriptor table management module can optionally receive a second memory page from the far memory, determine that space is not available in the near memory, apply an eviction policy to a plurality of memory pages stored in the near memory and exclude the first memory page from eviction, evict one of the plurality of memory pages according to the eviction policy, and write the second memory page to the near memory.

In Example 7, for the processing device of claim 1, the agent interface can further receive, from the memory agent, an unpin request indicating the first memory page, and the descriptor table management engine further to mark the first memory page as unpinned in the near memory, wherein marking the first memory page as unpinned comprises clearing the pinning bit corresponding to the first memory page in the cache descriptor table.

Example 8 is a method comprising: 1) receiving, from a memory agent, a pin request indicating a first memory page in a multi-level memory system, the multi-level memory system comprising a near memory and a far memory; 2) retrieving the first memory page from the far memory and writing the first memory page to the near memory; 3) marking, by a memory controller in a processing device, the first memory page as pinned in the near memory, wherein marking the first memory page as pinned comprises setting a pinning bit corresponding to the first memory page in a cache descriptor table maintained by the memory controller; and 4) preventing the first memory page from being evicted from the near memory when the first memory page is marked as pinned.

In Example 9, for the method of Example 8, the near memory can optionally comprise dynamic random access memory (DRAM) to provide faster data access times than the far memory.

In Example 10, for the method of Example 8, the far memory can optionally comprise non-volatile random access memory (NVRAM) that is less expensive than the near memory.

In Example 11, for the method of Example 8, the memory agent can optionally comprise a peripheral device management engine having a guaranteed performance requirement.

In Example 12, the method of Example 8, can optionally further comprise receiving, from the memory agent, a page request for the first memory page, retrieving the first memory page from the near memory, and providing the first memory page to the memory agent.

In Example 13, for the method of Example 8, preventing the first memory page from being evicted from the near memory can optionally comprise receiving a second memory page from the far memory, determining that space is not available in the near memory, applying an eviction policy to a plurality of memory pages stored in the near memory while excluding the first memory page from eviction, evicting one of the plurality of memory pages according to the eviction policy, and writing the second memory page to the near memory.

In Example 14, the method of Example 8, can optionally further comprise receiving, from the memory agent, an unpin request indicating the first memory page, and marking, by the memory controller in the processing device, the first memory page as unpinned in the near memory, wherein marking the first memory page as unpinned comprises clearing the pinning bit corresponding to the first memory page in the cache descriptor table.

Example 15 is a system comprising: 1) a multi-level memory system comprising a near memory and a far memory; and 2) a processing device, communicably coupled to the multi-level memory system, the processing device comprising pinning logic to receive, from a memory agent, a pin request indicating a first memory page in the multi-level memory system, retrieve the first memory page from the far memory and write the first memory page to the near memory, mark the first memory page as pinned in the near memory, wherein marking the first memory page as pinned comprises setting a pinning bit corresponding to the first memory page in a cache descriptor table maintained by the memory controller, and prevent the first memory page from being evicted from the near memory when the first memory page is marked as pinned.

In Example 16, for the system of Example 15, the near memory can optionally comprise dynamic random access memory (DRAM) to provide faster data access times than the far memory, and the far memory can optionally comprise non-volatile random access memory (NVRAM) that is less expensive than the near memory.

In Example 17, for the system of Example 15, the memory agent can optionally comprise a peripheral device management engine having a guaranteed performance requirement.

In Example 18, for the system of Example 15, the pinning logic can optionally further receive, from the memory agent, a page request for the first memory page, retrieve the first memory page from the near memory, and provide the first memory page to the memory agent.

In Example 19, for the system of Example 15, to prevent the first memory page from being evicted from the near memory, the pinning logic can optionally further receive a second memory page from the far memory, determine that space is not available in the near memory, apply an eviction policy to a plurality of memory pages stored in the near memory while excluding the first memory page from eviction, evict one of the plurality of memory pages according to the eviction policy, and write the second memory page to the near memory.

In Example 20, for the system of Example 15, the pinning logic can optionally further receive, from the memory agent, an unpin request indicating the first memory page and mark the first memory page as unpinned in the near memory, wherein marking the first memory page as unpinned comprises clearing the pinning bit corresponding to the first memory page in the cache descriptor table.

Example 21 is an apparatus comprising: 1) means for receiving, from a memory agent, a pin request indicating a first memory page in a multi-level memory system, the multi-level memory system comprising a near memory and a far memory; 2) means for retrieving the first memory page from the far memory and writing the first memory page to the near memory; 3) means for marking, by a memory controller in a processing device, the first memory page as pinned in the near memory, wherein marking the first memory page as pinned comprises setting a pinning bit corresponding to the first memory page in a cache descriptor table maintained by the memory controller; and 4) means for preventing the first memory page from being evicted from the near memory when the first memory page is marked as pinned.

In Example 22, for the apparatus of Example 21, the near memory can optionally comprise dynamic random access memory (DRAM) to provide faster data access times than the far memory.

In Example 23, for the apparatus of Example 21, the far memory can optionally comprise non-volatile random access memory (NVRAM) that is less expensive than the near memory.

In Example 24, for the apparatus of Example 21, the memory agent can optionally comprise a peripheral device management engine having a guaranteed performance requirement.

In Example 25, the apparatus of Example 21, can optionally further comprise means for receiving, from the memory agent, a page request for the first memory page, means for retrieving the first memory page from the near memory, and means for providing the first memory page to the memory agent.

In Example 26, for the apparatus of Example 21, the means for preventing the first memory page from being evicted from the near memory can optionally comprise means for receiving a second memory page from the far memory, means for determining that space is not available in the near memory, means for applying an eviction policy to a plurality of memory pages stored in the near memory while excluding the first memory page from eviction, means for evicting one of the plurality of memory pages according to the eviction policy, and means for writing the second memory page to the near memory.

In Example 27, the apparatus of Example 21, can optionally further comprise means for receiving, from the memory agent, an unpin request indicating the first memory page and means for marking, by the memory controller in the processing device, the first memory page as unpinned in the near memory, wherein marking the first memory page as unpinned comprises clearing the pinning bit corresponding to the first memory page in the cache descriptor table.

Example 28 is an apparatus comprising: 1) a memory; and a computing system coupled to the memory, wherein the computing system is configured to perform the method of at least one of the Examples 8-14.

In Example 29, for the apparatus of Example 28, the computing system can optionally comprise a processing device.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular embodiments may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A processing device comprising:
an instruction execution unit;
a memory agent; and
a memory control unit comprising pinning logic to pin memory pages in a multi-level memory system upon request by the memory agent, the pinning logic comprising:
an agent interface module to receive, from the memory agent, a request to retrieve a first memory page in the multi-level memory system, the multi-level memory system comprising a near memory and a far memory;
a memory interface module to retrieve the first memory page from the far memory and write the first memory page to the near memory; and
a descriptor table management module to:
compare an address, in the far memory, of the first memory page identified in the request to a range of memory addresses indicated in a static memory range register of the memory control unit;
determine that the range of memory addresses indicated in the static memory range register comprises the memory address of the first memory page;
mark the first memory page as pinned in the near memory in response to the range of memory addresses indicated in the static memory range register comprising the memory address of the first memory page, wherein to mark the first memory page as pinned, the descriptor table management module to set a pinning bit corresponding to the first memory page in a cache descriptor tables; and
prevent the first memory page from being evicted from the near memory when the first memory page is marked as pinned.

2. The processing device of claim 1, wherein the near memory comprises dynamic random access memory (DRAM) to provide faster data access times than the far memory.

3. The processing device of claim 1, wherein the far memory comprises non-volatile random access memory (NVRAM) that is less expensive than the near memory.

4. The processing device of claim 1, wherein the memory agent comprises a peripheral device management engine having a guaranteed performance requirement.

5. The processing device of claim 1, wherein the memory control unit further to:
receive, from the memory agent, a page request for the first memory page;
retrieve the first memory page from the near memory; and
provide the first memory page to the memory agent.

6. The processing device of claim 1, wherein to prevent the first memory page from being evicted from the near memory, the descriptor table management module to:
receive a second memory page from the far memory;
determine that space is not available in the near memory;
apply an eviction policy to a plurality of memory pages stored in the near memory and exclude the first memory page from eviction;
evict one of the plurality of memory pages according to the eviction policy; and
write the second memory page to the near memory.

7. The processing device of claim 1, wherein the agent interface module further to receive, from the memory agent, an unpin request indicating the first memory page, and the descriptor table management engine further to mark the first memory page as unpinned in the near memory, wherein marking the first memory page as unpinned comprises clearing the pinning bit corresponding to the first memory page in the cache descriptor table.

8. A method comprising:
receiving, from a memory agent, a request to retrieve a first memory page in a multi-level memory system, the multi-level memory system comprising a near memory and a far memory;
retrieving the first memory page from the far memory and writing the first memory page to the near memory;
comparing, by a memory controller in a processing device, an address, in the far memory, of the first memory page identified in the request to a range of memory addresses indicated in a static memory range register of the memory control unit;
determining, by the memory controller in the processing device, that the range of memory addresses indicated in the static memory range register comprises the memory address of the first memory page;

in response to the range of memory addresses indicated in the static memory range register comprising the memory address of the first memory page, marking, by the memory controller in the processing device, the first memory page as pinned in the near memory, wherein marking the first memory page as pinned comprises setting a pinning bit corresponding to the first memory page in a cache descriptor table maintained by the memory controller; and preventing the first memory page from being evicted from the near memory when the first memory page is marked as pinned.

9. The method of claim 8, wherein the near memory comprises dynamic random access memory (DRAM) to provide faster data access times than the far memory.

10. The method of claim 8, wherein the far memory comprises non-volatile random access memory (NVRAM) that is less expensive than the near memory.

11. The method of claim 8, wherein the memory agent comprises a peripheral device management engine having a guaranteed performance requirement.

12. The method of claim 8, further comprising:
receiving, from the memory agent, a page request for the first memory page;
retrieving the first memory page from the near memory; and
providing the first memory page to the memory agent.

13. The method of claim 8, wherein preventing the first memory page from being evicted from the near memory comprises:
receiving a second memory page from the far memory;
determining that space is not available in the near memory;
applying an eviction policy to a plurality of memory pages stored in the near memory while excluding the first memory page from eviction;
evicting one of the plurality of memory pages according to the eviction policy; and
writing the second memory page to the near memory.

14. The method of claim 8, further comprising:
receiving, from the memory agent, an unpin request indicating the first memory page; and
marking, by the memory controller in the processing device, the first memory page as unpinned in the near memory, wherein marking the first memory page as unpinned comprises clearing the pinning bit corresponding to the first memory page in the cache descriptor table.

15. A system comprising:
a multi-level memory system comprising a near memory and a far memory; and
a processing device, communicably coupled to the multi-level memory system, the processing device to:
receive, from a memory agent, a request to retrieve a first memory page in the multi-level memory system;
retrieve the first memory page from the far memory and write the first memory page to the near memory;
compare an address, in the far memory, of the first memory page identified in the request to a range of memory addresses indicated in a static memory range register of the memory control unit;
determine that the range of memory addresses indicated in the static memory range register comprises the memory address of the first memory page;
in response to the range of memory addresses indicated in the static memory range register comprising the memory address of the first memory page, mark the first memory page as pinned in the near memory, wherein to mark the first memory page as pinned, the processing device to set a pinning bit corresponding to the first memory page in a cache descriptor table maintained by the memory controller; and
prevent the first memory page from being evicted from the near memory when the first memory page is marked as pinned.

16. The system of claim 15, wherein the near memory comprises dynamic random access memory (DRAM) to provide faster data access times than the far memory, and wherein the far memory comprises non-volatile random access memory (NVRAM) that is less expensive than the near memory.

17. The system of claim 15, wherein the memory agent comprises a peripheral device management engine having a guaranteed performance requirement.

18. The system of claim 15, wherein the processing device further to:
receive, from the memory agent, a page request for the first memory page;
retrieve the first memory page from the near memory; and
provide the first memory page to the memory agent.

19. The system of claim 15, wherein to prevent the first memory page from being evicted from the near memory, the processing device further to:
receive a second memory page from the far memory;
determine that space is not available in the near memory;
apply an eviction policy to a plurality of memory pages stored in the near memory while excluding the first memory page from eviction;
evict one of the plurality of memory pages according to the eviction policy; and
write the second memory page to the near memory.

20. The system of claim 15, wherein the processing device further to:
receive, from the memory agent, an unpin request indicating the first memory page; and
mark the first memory page as unpinned in the near memory, wherein marking the first memory page as unpinned comprises clearing the pinning bit corresponding to the first memory page in the cache descriptor table.

* * * * *